United States Patent Office 3,272,814
Patented Sept. 13, 1966

3,272,814
4,6-DIAMINO-1-ARYL-1,2-DIHYDRO-s-TRIAZINES
Royal A. Cutler, Sand Lake, and Samuel Schalit, Albany, N.Y., assignors to Sterling Drug Inc., New York, N.Y., a corporation of Delaware
No Drawing. Filed Feb. 14, 1963, Ser. No. 258,653
18 Claims. (Cl. 260—249.9)

This invention relates to certain novel 4,6-diamino-1-aryl-1,2-dihydro-s-triazines, to intermediates therefor, and to the preparation of the same.

The compounds of this invention have biocidal and biostatic properties and are useful as chemotherapeutic agents. They are especially useful as anticoccidial agents. Some of the compounds also have antibacterial, antimalarial, antiamebic, anthelmintic, and other activities as more particularly indicated herein below.

The compounds of the instant invention are: the 4,6-diamino-1-(aryl)-1,2-dihydro-2-($R^1$)-2-($R^2$) - s - triazines having the structural formula

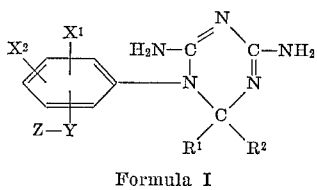

Formula I where $R^1$ is a member of the group consisting of lower alkyl and hydroxy-lower alkyl, $R^2$ is a member of the group consisting of hydrogen and lower alkyl, $X^1$ is a member of the group consisting of lower alkyl-S-, lower alkyl-SO-, lower alkyl-$SO_2$-, and halogen, $X^2$ is a member of the group consisting of hydrogen and halogen, Y is a member of the group consisting of —S—, —SO—, and —$SO_2$—, and Z is a member of the group consisting of lower alkyl, lower alkenyl, cyclohexyl, cyclopentyl, phenyl, lower alkylphenyl, halophenyl, nitrophenyl, halonitrophenyl, benzyl, ar-halobenzyl, ar-nitrobenzyl, and ar-halo-ar-nitrobenzyl; the bis[ar-halo-4-(4,6-diamino-1,2-dihydro-2-($R^1$)-2-($R^2$)-s-triazin-1-yl)phenyl] disulfide dihydrochlorides having the structural formula

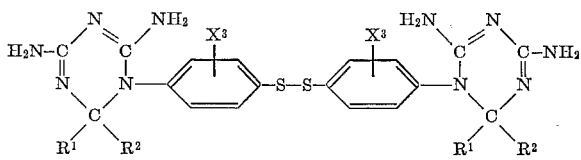

Formula II where $R^1$ is a member of the group consisting of lower alkyl and hydroxy-lower alkyl, $R^2$ is a member of the group consisting of hydrogen and lower alkyl, and $X^3$ is halogen; and the 4,6-diamino-1-[4-(nitrophenyl-Y-)phenyl]-1,2-dihydro-2-($R^1$)-2-($R^2$)-s-triazines having the structural formula

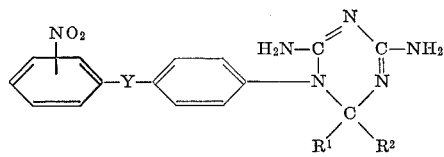

Formula III where $R^1$ is a member of the group consisting of lower alkyl and hydroxy-lower alkyl, $R^2$ is a member of the group consisting of hydrogen and lower alkyl, and Y is a member of the group consisting of —S—, —SO—, and —$SO_2$—.

In Formula I, when Z is phenyl substituted by either or both of halogen (i.e., fluorine, chlorine, bromine, or iodine) and nitro, or is benzyl substituted in the aromatic ring by either or both of halogen (i.e., fluorine, chlorine, bromine, or iodine) and nitro, the substituents in each instance can occupy any of the available positions in the ring. These radicals include, for example, o-chlorophenyl, p-chlorophenyl, m-bromophenyl, m-fluorophenyl, p-iodophenyl, 2-chloro-4-nitrophenyl, 2-nitro-4-bromophenyl, m-nitrophenyl, p-nitrophenyl, o-chlorobenzyl, m-bromobenzyl, p-fluorobenzyl, 2-chloro-4-nitrobenzyl, 3-bromo-4-nitrobenzyl, p-nitrobenzyl, and the like.

When Z in Formula I is lower alkenyl, there are included the monovalent lower molecular weight unsaturated aliphatic hydrocarbon radicals containing a double bond, and preferably having 2–6 carbon atoms, for example —CH=$CH_2$
—$CH_2$—CH=$CH_2$
—$CH_2$—CH=CH—$CH_3$
—$CH_2CH_2CH_2$—CH=$CH_2$
—$CH_2$—CH=C($CH_3$)$_2$
—$CH_2$CH=CH—$CH_2CH_2CH_3$
—$CH_2CH_2$—CH=CH—$CH_2CH_3$
—$CH_2$—C($CH_3$)=$CH_2$ and the like.

When $X^1$ in Formula I is lower alkyl-S-, lower alkyl-SO-, or lower alkyl-$SO_2$-, and when Z in Formula I is lower alkyl, in each case the lower alkyl group is a monovalent lower molecular weight saturated aliphatic hydrocarbon radical, the preferred radicals being those having 1–8 carbon atoms, for example methyl, ethyl, n-propyl, isopropyl, n-butyl, n-amyl, n-hexyl, isooctyl, and the like.

In Formula I, when Z is lower alkylphenyl, the lower alkyl group therein preferably contains 1–6 carbon atoms, and there are included for example o-tolyl, m-tolyl, p-tolyl, p-ethylphenyl, m-isopropylphenyl, p-hexylphenyl, and the like.

When $R^1$ in Formulas I, II, and III or $R^2$ in Formulas I, II, and III is lower alkyl, there are included the monovalent lower molecular weight saturated aliphatic hydrocarbon radicals, the preferred alkyl radicals being those having 1–6 carbon atoms, for example methyl, ethyl, n-propyl, isopropyl, n-butyl, isohexyl, and the like.

When $X^1$ or $X^2$ in Formula I or $X^3$ in Formula II is halogen, there are included fluorine, chlorine, bromine, and iodine.

When $R^1$ in Formula I is hydroxy-lower alkyl, there are included the hydroxy-lower molecular weight saturated aliphatic hydrocarbon containing from 2 to 6 carbon atoms, for example 2-hydroxyethyl, 2-hydroxypropyl, 3-hydroxypropyl, 3-hydroxybutyl, 6-hydroxyhexyl, and the like.

In free base form, our new compounds are basic substances which interact with organic and inorganic acids to form the corresponding acid-solution salts. These acid-addition salts and the free bases of course have the common respective structural entities represented by the structural Formulas I, II, and III. The acid-addition salts are the full equivalents of the free base forms, and the new compounds of the invention thus reside in the concept of the bases and cationic forms and not in any particular acid moiety or acid anion associated with the salt forms of our compounds; rather, the acid moieties or anions which can be associated in the salt forms are in themselves neither novel nor critical and therefore can be any acid anion or acid-like substance capable of salt formation with bases. It will be appreciated that in aqueous solutions the base form and the water-soluble acid-addition salt form of the compounds of the invention possess a common protonated cation or ammonium ion.

Thus the acid-addition salts discussed above and claimed herein are prepared from any organic acid, inorganic acid (including organic acids having an inorganic group therein), or organo-metallic acid as exemplified by organic mono- and poly-carboxylic acids such as found, for example, in Beilstein's Organische Chemie, 4th ed., volumes III, IV, IX, X, XIV, XVII, XIX, XXI, XXII and XXV; organic mono- and polysulfonic and -sulfinic acids such as found, for example in Beilstein volumes VI, XI, XVI, and XXII; organic phosphonic and phosphinic acids such as found, for example, in Beilstein volumes XI and XVI; organic acids of arsenic and antimony such as found, for example, in Beilstein volume XVI; organic heterocyclic carboxylic, sulfonic, and sulfinic acids such as found, for example in Beilstein volumes XVIII, XXII, and XXV; acidic ion-exchange resins; and inorganic acids of any acid forming element or combination of elements such as found in Mellor, Comprehensive Treatise on Inorganic and Theoretical Chemistry, Longman's, Green and Co., New York, N.Y., volumes I–XVI. In addition, other salt-forming compounds which are acidic in their chemical properties but which are not generally considered as acids in the same sense as carboxylic or sulfonic acids are also considered to be among the numerous acids which can be used to prepare acid-addition salts of the compounds of the invention. Thus there is also comprehended acidic phenolic compounds such as found, for example, in volume VI of Beilstein, acidic compounds having "activated" or acidic hydrogen atoms, as for example, picrolonic acid, or barbituric acid derivatives having an acidic proton such as found, for example, in Cox et al., Medicinal Chemistry, vol. IV, John Wiley and Sons, Inc., New York, N.Y. (1959). Also comprehended as salt forming agents are so-called Lewis acids which lack a pair of electrons in the outer "electron shell" and react with basic compounds having an unshared pair of electrons to form salts, for example boron trifluoride.

Representative acids for the formation of the acid-addition salts include formic acid, acetic acid, isobutyric acid, alpha-mercaptopropionic acid, trifluoroacetic acid, malic acid, fumaric acid, succinic acid, succinamic acid, glutamic acid, tartaric acid, oxalic acid, pyromucic acid, citric acid, lactic acid, glycolic acid, gluconic acid, saccharic acid, ascorbic acid, penicillin, benzoic acid, phthalic acid, salicylic acid, 3,5-dinitrobenzoic acid, anthranilic acid, cholic acid, 2-pyridinecarboxylic acid, 3-hydroxy-2-naphthoic acid, picric acid, quinic acid, tropic acid, 3-indoleacetic acid, barbituric acid, sulfamic acid, methanesulfonic acid, ethanesulfonic acid, isethionic acid, benzenesulfonic acid, p-toluenesulfonic acid, butylarsonic acid, methanephosphonic acid, acidic resins, hydrofluoric acid, hydrochloric acid, hydrobromic acid, hydriodic acid, perchloric acid, nitric acid, sulfuric acid, phosphoric acid, hydrocyanic acid, phosphotungstic acid, molybdic acid, arsenic acid, and the like.

The acid-addition salts are prepared in conventional fashion, for instance either by direct mixing of the acid and the base or, when this is not appropriate, by dissolving either or both of the acid and the base separately in water or an organic solvent and mixing the two solutions, or by dissolving both the acid and the base together in a solvent. The resulting acid-addition salt is isolated by filtration, if it is insoluble in the reaction medium, or by evaporation of the reaction medium to leave the acid-addition salt as a residue.

The mono- and di-acid-addition salts of the free base forms of the compounds of Formulas I, II, and III are useful not only as chemotherapeutic agents, but are also useful as characterizing or identifying derivatives of the free bases and in isolation or purification procedures. Moreover, the acid-addition salts react with strong bases, such as alkali metal hydroxides, to generate the free bases, and accordingly all of the salts, regardless of considerations of solubility, toxicity, physical form, or the like of a particular species of acid-addition salt, are useful for the purposes of our invention since they are sources of the free bases.

It will be appreciated from the above that if one or more of the characteristics, such as solubility, molecular weight, physical appearance, toxicity, or the like of a given acid-addition salt render it unsuitable for the particular desired purpose, as for example, use as an anticoccidial agent or in an isolation or purification procedure, or the like, the acid-addition salt can be converted to the free base and then to another, more suitable acid-addition salt, for instance a pharmaceutically-acceptable salt when a pharmaceutical use is involved.

The preparation of the compounds of our invention is conveniently carried out by interacting an appropriate 1-(aryl)biguanide and a lower aliphatic aldehyde or ketone having the structural formula $$R^1-CO-R^2$$

Formula IV wherein $R^1$ and $R^2$ have the same significance indicated hereinabove, in the presence of a strong acid such as hydrochloric acid. The 1-(aryl)biguanide reactant has the structural formula

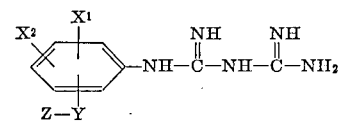

Formula V in the preparation of the compounds of Formula I; has the structural formula

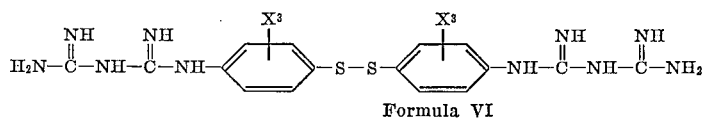

Formula VI in the preparation of the compounds of Formula II; and has the structural formula

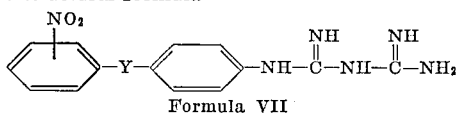

Formula VII in the preparation of the compounds of Formula III, where $X^1$, $X^2$, $X^3$, Y and Z have the same significance indicated hereinabove. Preferably, at least one equivalent proportion of the strong acid is employed when the 1-(aryl)biguanide has the Formula V or VII and at least two equivalent proportions are used when the 1-(aryl)biguanide has the Formula VI. The reactants are stirred together, usually with heating and preferably in an aqueous alcoholic solution or in an excess of the lower aliphatic aldehyde or ketone. The desired reaction product is readily recovered by chilling the reaction mixture, after concentration if necessary, and collecting the solid which separates from solution.

The 1-(aryl)biguanides employed as starting materials in the above process are readily prepared by interacting, in the presence of a strong acid, dicyanodiamide and the appropriate substituted aniline having the structural formula

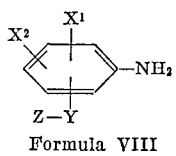

Formula VIII or

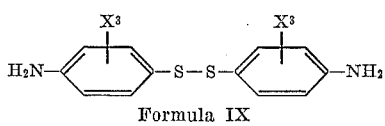

Formula IX or

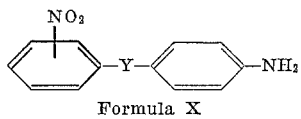

Formula X wherein $X^1$, $X^2$, $X^3$, Y, and Z have the same significance indicated hereinabove. The anilines of Formula VIII, IX, and X are old classes of compounds readily obtained by conventional preparative methods, as illustrated in the examples hereinbelow.

We have found that it is usually more convenient in the preparation of the compounds of Formulas I, II, and III which are derived from lower aliphatic keytones, that is, where $R^2$ in Formulas I, II, and III is lower alkyl, to interact the appropriate substituted aniline (Formulas VIII, IX, and X), the lower aliphatic ketone (Formula IV), and dicyanodiamide in the presence of a strong acid, thus avoiding the necessity for isolating the 1-(aryl)biguanide (Formulas V, VI, and VII) which is derivable by interaction of the substituted aniline (Formulas VIII, IX, and X) and the dicyanodiamide components. In this reaction, if desired, the lower aliphatic ketone can be employed in excess of the theoretical amount required as a reactant, to serve as a solvent medium.

The species of Formulas I and III which are sulfoxides (i.e., where Y is —SO—) can be prepared by the general methods above and also by oxidation of the corresponding sulfides, for instance by oxidation with one equivalent of hydrogen peroxide. The species of Formulas I and III which are sulfones (i.e., where Y is —SO$_2$—) can be prepared by the general methods above and also by oxidation of the corresponding sulfides with two equivalents, or of the corresponding sulfoxides with one equivalent, of an organic peracid such as peracetic acid or perbenzoic acid.

For many purposes, we prefer the hydrochloride salt forms of the compounds of our invention, and for purposes of convenience the invention is particularly described in the illustrative examples in terms of the hydrochloride salt forms, but as will be appreciated from the above, the hydrochlorides are merely representative of the acid-addition salt forms and the corresponding free base forms of our novel compounds. Generally speaking, the hydrochlorides are high-melting solids having low water solubility.

The chemical structures of the compounds of this invention followed from the modes of preparation and from elementary analyses of the products.

Our invention is illustrated by the following examples without, however, being limited thereto.

*Example 1*

(A) 250 g. of 3,4-dichloronitrobenzene was interacted with 460 g. of sodium sulfide (assay: 59 percent) in 2.5 liters of water to produce 3-chloro-4-(sodiomercapto)aniline, and this product was methylated by treatment with 164 g. of dimethyl sulfate to yield 3-chloro-4-(methylmercapto)aniline. This base in diethyl ether solution was treated with dry hydrogen chloride. There was thus obtained 221 g. of 3-chloro-4-(methylmercapto)aniline hydrochloride, which melted at 225–230° C.

(B) A mixture of 50 g. of 3-chloro-4-(methylmercapto)-aniline hydrochloride, 21.4 g. of dicyanodiamide, and 500 ml. of acetone was refluxed for twenty-four hours. The reaction mixture was then chilled, and the white solid which separated from solution was collected on a filter, was washed with acetone, and was sucked dry. The solid thus obtained weighed 65.4 g. A 45 g. portion of this solid was recrystallized from 1100 ml. of 95 percent ethyl alcohol with charcoaling to yield 34 g. of 4,6-diamino-1-(3-chloro-4-methylmercaptophenyl) - 1,2 - dihydro-2,2-dimethyl-s-triazine hydrochloride as a white powder which melted at 216–219° C.

This salt was soluble in water at 25° C. to the extent of 0.5 percent; and the pH of the 0.5 percent aqueous solution was 7.0.

*Example 2*

(A) 156 g. of p-(methylsulfinly)acetanilide (obtained by oxidizing p-(methylmercapto)acetanilide with 30 percent hydrogen peroxide solution) was heated with 780 ml. of concentrated hydrochloric acid to yield 73.8 g. of 2-chloro-4-(methylmercapto)aniline hydrochloride, which melted at 222–224° C.

(B) Proceeding in a manner similar to that described in part B of Example 1, a mixture of 73 g. of 2-chloro-4-(methylmercapto)aniline hydrochloride, 31.3 g. of dicyanodiamide, and 730 ml. of acetone was refluxed to yield 46 g. of 4,6-diamino-1-(2-chloro-4-methylmercaptophenyl)-1,2-dihydro-2,2-dimethyl-s-triazine as white prisms which melted at 215–217° C.

This salt was soluble in water at 25° C. to the extent of 1 percent. The pH of the 1 percent aqueous solution was 5.8, and no precipitate formed when the pH of this solution was adjusted to 7.0 by addition of N/10 sodium hydroxide solution.

*Example 3*

(A) 240 g. of 3,4-dichloronitrobenzene was reduced by treatment with 440 g. of 59 percent sodium sulfide in 2.5 liters of water to yield 3-chloro-4-(sodiomercapto)aniline, which was ethylated by reaction with 193 g. of diethyl sulfate to produce 3-chloro-4-(ethylmercapto)aniline, and this base was treated in diethyl ether solution with dry hydrogen chloride, thereby yielding 183 g. of crude 3-chloro-4-(ethylmercapto)aniline hydrochloride.

(B) Proceeding in a manner similar to that described in part B of Example 1, a mixture of 100 g. of 3-chloro-4-(ethylmercapto)aniline hydrochloride, 40 g. of dicyanodiamide, and 1 liter of acetone was refluxed to produce 123 g. of solid product which was recrystallized from methanol with charcoaling to yield 47.5 g. of 4,6-diamino-1-(3-chloro-4-ethylmercaptophenyl)-1,2-dihydro-2,2 - dimethyl-s-triazine hydrochloride as a white powder which melted at 207–211° C.

This salt was soluble in water at 25° C. to the extent of 0.25 percent. The pH of the 0.25 percent aqueous solution was 7.2; and no precipitate formed when the pH of this solution was adjusted to 7.0 by addition of N/10 hydrochloric acid.

*Example 4*

By refluxing a mixture of 70 g. of 3-chloro-4-(n-propylmercapto)aniline hydrochloride, 25.8 g. of dicyanodiamide, and 700 ml. of acetone, there was obtained 98.2 g. of 4,6-diamino-1-(3-chloro-4-n-propylmercaptophenyl)-1,2-dihydro-2,2-dimethyl-s-triazine hydrochloride as a white powder which melted at 203–206° C.

The solubility of this salt in water at 25° C. was less than 0.25 percent, and its solubility in 95 percent ethyl alcohol was less than 1 percent.

*Example 5*

By refluxing a mixture of 100 g. of 3-chloro-4-(isopropylmercapto)aniline hydrochloride (obtained by interacting 3-chloro-4-(sodiomercapto)aniline with isopropyl bromide and treating the base thus obtained with hydrogen chloride), 36.9 g. of dicyanodiamide, and 1000 ml. of acetone, there was obtained 136.7 g. of 4,6-diamino-1-(3-chloro-4-isopropylmercaptophenyl) - 1,2-dihydro-2,2-dimethyl-s-triazine hydrochloride as a white powder which melted at 206–208° C.

The solubility of this salt in water at 25° C. was less than 0.25 percent, and its solubility in 95 percent ethyl alcohol was less than 1 percent.

Example 6

By refluxing a mixture of 250 g. of 3-chloro-4-(n-butylmercapto)aniline hydrochloride (obtained by interacting 3-chloro-4-(sodiomercapto)aniline with n-butyl iodide and treating the base thus obtained with hydrogen chloride), 89.1 g. of dicyanodiamide, and 2250 ml. of acetone, there was obtained 136.7 g. of 4,6-diamino-1-(3-chloro-4-n-butylmercaptophenyl)-1,2-dihydro - 2,2-dimethyl-s-triazine hydrochloride as white crystals which melted at 193–196° C.

The solubility of this salt in water at 25° C. was less than 0.25 percent, and its solubility in 95 percent ethyl alcohol was less than 1 percent.

Example 7

By refluxing a mixture of 135 g. of 3-chloro-4-(n-amylmercapto)aniline hydrochloride (M.P. 135–155° C.; obtained by interacting 3-chloro-4-(sodiomercapto)aniline with n-amyl iodide and treating the base thus obtained with hydrogen chloride), 45.5 g. of dicyanodiamide, and 1150 ml. of acetone, there was obtained 78.4 g. of 4,6-diamino-1-(3-chloro-4-n-amylmercaptophenyl) - 1,2-dihydro-2,2-dimethyl-s-triazine hydrochloride as white crystals which melted at 197–199° C.

The solublility of this salt in water at 25° C. was less than 0.25 percent, and its solubility in 95 percent ethyl alcohol was approximately 1 percent.

Example 8

By refluxing a mixture of 61.2 g. of 3-chloro-4-(n-hexylmercapto)aniline hydrochloride (M.P. 145–155° C.; obtained by interacting 3-chloro-4-(sodiomercapto)aniline with n-hexyl iodide and treating the base thus obtained with hydrogen chloride), 19 g. of dicyanodiamide, and 510 ml. of acetone, there was obtained 70.5 g. of 4,6-diamino-1-(3-chloro-4-n - hexylmercaptophenyl)-1,2-dihydro-2,2-dimethyl-s-triazine hydrochloride as a white powder which melted at 198–200° C.

The solublility of this salt in water at 25° C. was less than 0.25 percent, and its solubility in 95 percent ethyl alcohol was approximately 1 percent.

Example 9

A mixture of 50 g. of 3-chloro-4-(methylmercapto)aniline, 25 g. of dicyanodiamide, 38 g. of 4-hydroxy-2-butanone, 24.2 ml. of concentrated hydrochloric acid, and 83 ml. of anhydrous ethyl alcohol was stirred at room temperature (about 25° C.) for twenty-four hours. All of the solid went into solution during the first hour of stirring. The resulting clear, dark red solution was mixed with decolorizing charcoal and filtered, and the filtrate was chilled in a refrigerator. The solid (30 g.) which separated from solution, which was a biguanide, was collected on a filter, and the filtrate was diluted with anhydrous diethyl ether and chilled in a refrigerator. A further quantity of the biguanide separated from solution and was removed by filtration. The filtrate was concentrated under reduced pressure to yield a dark red oily sludge. After this sludge was allowed to stand, a reddish brown precipitate formed. This precipitate was slurried in isoamyl alcohol and the slurry was filtered. There was thus obtained 5.5 g. of a light yellow solid. This product, which was 4,6-diamino-1-(3-chloro - 4-methylmercaptophenyl)-1,2-dihydro-2-methyl-2-(2-hydroxyethyl)-s-triazine hydrochloride, melted at 202–203° C.

This salt was soluble in water at 25° C. to the extent of 0.5 percent. The pH of the 0.5 percent aqueous solution was 6.4, and no precipitate formed when the pH of this solution was adjusted to 7.0 by addition of N/10 sodium hydroxide solution.

Example 10

(A) To approximately two liters of liquid ammonia in a vessel fitted with a condenser cooled with a mixture of solid carbon dioxide and acetone there was added 93 g. of powdered sodamide in small portions over a period of approximately five minutes. To the resulting mixture at −40° C. there was gradually added, over a period of fifty minutes, 115 g. of 2,5-dichlorothioanisole. The dark brown reaction mixture was stirred for approximately three and one-half hours. There was then added to the reaction mixture 158 g. of powdered ammonium chloride in small portions over a period of one-half hour. After stirring the reaction mixture for forty-five minutes, 460 ml. of dry benzene was added gradually over a period of approximately ten minutes. Most of the ammonia was allowed to evaporate from the reaction mixture over night. The reaction mixture was heated on a steam bath until the benzene started refluxing and the hot mixture was then filtered. The filtrate was evaporated under reduced pressure thereby yielding as a residue a dark brown oil. This oil was dissolved in 1 liter of anhydrous diethyl ether, the ethereal solution was filtered to remove a small amount of brown solid, and the filtrate was treated with decolorizing charcoal and filtered. The filtrate, which contained 3-methylmercapto-4-chloroaniline, was diluted to a volume of 2500 ml. by addition of anhydrous diethyl ether, the solution was chilled, and dry hydrogen chloride was passed in for forty minutes. There was thus obtained 113.5 g. of crude 3-methylmercapto-4-chloroaniline hydrochloride. This product was purified by reconversion to the free base and fractional distillation of the free base under high vacuum. For use in part C below, a fraction weighing 31 g. which distilled at 126–129° C. at 0.2 mm. pressure as a pale yellow liquid, $n_D^{25}=1.6512$, was converted to the hydrochloride. There was thus obtained 32 g. of 3-methylmercapto-4-chloroaniline hydrochloride as an off-white solid which melted at 266–270° C. with decomposition.

(B) 59 g. of 2-hydroxy-6-nitrobenzothiazole was heated in an autoclave with 750 ml. of ammonium hydroxide (28–29 percent solution of ammonia in water) at 157° C. for four hours to produce the ammonia salt of 2-amino-5-nitrothiophenol, which was then methylated by treatment with 28.4 ml. of dimethyl sulfate and 40 ml. of 35 percent aqueous sodium hydroxide solution to yield 38 g. of 2-methylmercapto-4-nitroaniline. After recrystallization from methyl alcohol this latter product melted at 69–72° C. By diazotization and treatment of the resulting diazonium salt with cuprous chloride, 2-methylmercapto-4-nitroaniline was converted to 2-methylmercapto-4-nitrochlorobenzene, M.P. 102–103° C., which by reduction with iron powder and glacial acetic acid was converted to 3-methylmercapto-4-chloroaniline. This base and the hydrochloride thereof were identical, respectively, with the 3-methylmercapto-4-chloroaniline and hydrochloride thereof described in part A above.

(C) By refluxing a mixture of 29 g. of 3-methylmercapto-4-chloroaniline hydrochloride, 12.5 g. of dicyanodiamide, and 290 ml. of acetone, there was obtained 33.2 g. of 4,6-diamino-1-(3-methylmercapto-4-chlorophenyl)-1,2-dihydro-2,2-dimethyl-s-triazine hydrochloride as a white powder which melted at 213–214° C.

The solubility of this salt in water at 25° C. was less than 0.25 percent, and its solubility in 95 percent ethyl alcohol was less than 1 percent.

Example 11

By refluxing a mixture of 100 g. of 3-chloro-4-(allylmercapto)aniline hydrochloride (obtained by interacting 3-chloro-4-(sodiomercapto)aniline with allyl bromide and treating the base thus obtained with hydrogen chloride), 38.2 g. of dicyanodiamide, and 960 ml. of acetone, there was obtained 48.9 g. of 4,6-diamino-1-(3-chloro - 4 - allylmercaptophenyl) - 1,2 - dihydro - 2,2- dimethyl-s-triazine hydrochloride as a white powder which melted at 197–199° C.

The solubility of this salt in water at 25° C. was less than 0.25 percent, and its solubility in 95 percent ethyl alcohol was less than 1 percent.

*Example 12*

By refluxing a mixture of 18.7 g. of 3-chloro-4-(methallylmercapto)aniline (obtained by interacting 3-chloro-4-(sodiomercapto)aniline with methallyl chloride), 7.6 g. of dicyanodiamide, 200 ml. of acetone, and 7.3 ml. of concentrated hydrochloric acid, there was obtained 22.8 g. of 4,6-diamino-1-(3-chloro-4-methallylmercaptophenyl)-1,2-dihydro-2,2-dimethyl-s-triazine hydrochloride as a white powder which melted at 189–190° C.

The solubility of this salt in water at 25° C. was less than 0.25 percent, and its solubility in 95 percent ethyl alcohol was less than 1 percent.

*Example 13*

By refluxing a mixture of 50 g. of 3-chloro-4-(o-chlorobenzylmercapto)aniline hydrochloride (obtained by interacting 3-chloro-4-(sodiomercapto)aniline with o-chlorobenzyl chloride and treating the base thus obtained with hydrogen chloride), 13.5 g. of dicyanodiamide, and 360 ml. of acetone, there was obtained 49.7 g. of 4,6-diamino - 1 - [3 - chloro - 4 - (o-chlorobenzylmercapto)-phenyl]-1,2-dihydro-2,2-dimethyl-s-triazine hydrochloride as a white powder which melted at 197–198° C.

The solubility of this salt in water at 25° C. was less than 0.25 percent, and its solubility in 95 percent ethyl alcohol was less than 1 percent.

*Example 14*

By refluxing a mixture of 23.9 g. of 3-chloro-4-(p-chlorobenzylmercapto)aniline hydrochloride (obtained by interacting 3-chloro-4-(sodiomercapto)aniline with p-chlorobenzyl chloride), 6.4 g. of dicyanodiamide, and 169 ml. of acetone, there was obtained 13.7 g. of 4,6-diamino - 1 - [3 - chloro - 4 - (p-chlorobenzylmercapto)-phenyl]-1,2-dihydro-2,2-dimethyl-s-triazine hydrochloride as a white powder which melted at 202–205° C.

The solubility of this salt in water at 25° C. was less than 0.25 percent, and its solubility in 95 percent ethyl alcohol was less than 1 percent.

*Example 15*

(A) A mixture of 89.3 g. of 3-chloro-4-(methylmercapto)aniline, 43.3 g. of dicyanodiamide, 42.8 ml. of concentrated hydrochloric acid, and 178.5 ml. of water was refluxed for one hour. During the early part of this period the solid reactants went into solution. The reaction mixture was then chilled in a refrigerator, and the solid which separated from solution was collected on a filter, washed with cold water, and dried. This product, which weighed 117 g., was recrystallized from methyl alcohol to yield 80.8 g. of 1-(3-chloro-4-methylmercaptophenyl)biguanide hydrochloride, which melted at 192–194° C.

(B) A mixture of 50 g. of 1-(3-chloro-4-methylmercaptophenyl)biguanide hydrochloride, 45.7 ml. of n-heptaldehyde, 14.2 ml. of concentrated hydrochloric acid, and 170 ml. of anhydrous ethyl alcohol was refluxed for four hours. The resulting solution was chilled and the white solid which separated from solution was collected on a filter, washed with cold 95 percent ethyl alcohol and dried. The product thus obtained was stirred in diethyl ether and the resulting slurry was filtered. The solid thus collected was recrystallized from 95 percent ethyl alcohol to yield 18.7 g. of 4,6-diamino-1 - (3 - chloro - 4 - methylmercaptophenyl) - 1,2 - dihydro-2-(n-hexyl)-s-triazine hydrochloride in the form of a white powder which melted at 220–221° C.

The solubility of this salt in water at 25° C. was less than 0.25 percent, and its solubility in 95 percent ethyl alcohol was less than 1 percent.

*Example 16*

By refluxing a mixture of 57.5 g. of 3,5-dichloro-4-(methylmercapto)aniline (obtained by interacting 3,5-dichloro-4-(sodiomercapto)aniline with dimethyl sulfate), 23.5 ml. of concentrated hydrochloric acid, 24.8 g. of dicyanodiamide, and 575 ml. of acetone, there was obtained 32 g. or 4,6-diamino-1-(3,5-dichloro-4-methylmercaptophenyl)-1,2-dihydro - 2,2-dimethyl-s-triazine hydrochloride as off-white platelets which melted at 217–221° C.

This salt was soluble in water at 25° C. to the extent of 0.5 percent. The pH of the 0.5 percent aqueous solution was 7.6, and no precipitate formed when the pH of this solution was adjusted to 7.0 by addition of N/10 hydrochloric acid.

*Example 17*

By refluxing a mixture of 31 g. of 3,5-dichloro-4-(ethylmercapto)aniline (obtained by interacting 3,5-dichloro-4-(sodiomercapto)aniline with diethyl sulfate), 12 ml. of concentrated hydrochloric acid, 12.6 g. of dicyanodiamide, and 290 ml. of acetone, there was obtained 31.7 g. of 4,6-diamino-1-(3,5-dichloro-4-ethylmercaptophenyl)-1,2-dihydro-2,2-dimethyl-s-triazine hydrochloride as a white powder which melted at 214–216° C.

The solubility of this salt in water at 25° C. was less than 0.25 percent, and its solubility in 95 percent ethyl alcohol was less than 1 percent.

*Example 18*

By refluxing a mixture of 17 g. of 3,5-dichloro-4-(n-propylmercapto)aniline (obtained by interacting 3,5-dichloro-4-(sodiomercapto)aniline with n-propyl bromide), 6 ml. of concentrated hydrochloric acid, 6.5 g. of dicyanodiamide, and 160 ml. of acetone, there was obtained 14.8 g. of 4,6-diamino-1-(3,5-dichloro-4-n-propylmercaptophenyl)-1,2-dihydro-2,2 - dimethyl-s-triazine hydrochloride as a white powder which melted at 202–203° C.

The solubility of this salt in water at 25° C. was less than 0.25 percent, and its solubility in 95 percent ethyl alcohol was less than 1 percent.

*Example 19*

By refluxing a mixture of 17.6 g. of 3,5-dichloro-4-(n-butylmercapto)aniline hydrochloride (obtained by interacting 3,5-dichloro-4-(sodiomercapto)aniline with n-butyl iodide and treating the base thus obtained with hydrogen chloride), 5.5 g. of dicyanodiamide, and 200 ml. of acetone, there was obtained 19.3 g. of 4,6-diamino-1-(3,5-dichloro-4 - n-butylmercaptophenyl) - 1,2-dihydro - 2,2-dimethyl-s-triazine hydrochloride as white microcrystals which melted at 190–194° C.

The solubility of this salt in water at 25° C. was less than 0.25 percent, and its solubility in 95 percent ethyl alcohol was less than 1 percent.

*Example 20*

By refluxing a mixture of 20 g. of 3,5-dichloro-4-(n-amylmercapto)aniline hydrochloride (obtained by interacting 3,5-dichloro-4-(sodiomercapto)aniline with n-amyl iodide and treating the base thus obtained with hydrogen chloride), 5.9 g. of dicyanodiamide, and 200 ml. of acetone, there was obtained 21 g. of 4,6-diamino-1-(3,5-dichloro - 4-n-amylmercaptophenyl) - 1,2-dihydro - 2,2-dimethyl-s-triazine hydrochloride as a white powder which melted at 191–194° C.

The solubility of this salt in water at 25° C. was less than 0.25 percent, and its solubility in 95 percent ethyl alcohol was less than 1 percent.

*Example 21*

(A) 79 g. of 3-chloro-4-(sodiomercapto)aniline was interacted with 64.5 g. of cyclopentyl bromide to produce 3-chloro-4-(cyclopentylmercapto)aniline. This base was treated in ethereal solution with dry hydrogen chloride to yield 65.1 g. of 3-chloro-4-(cyclopentylmercapto)aniline hydrochloride which melted at 196–205° C.

(B) By refluxing a mixture of 25 g. of 3-chloro-4-(cyclopentylmercapto)aniline hydrochloride, 8.2 g. of dicyanodiamide, and 216 ml. of acetone, there was obtained 33.6 g. of 4,6-diamino-1-(3-chloro-4-cyclopentylmercaptophenyl)-1,2-dihydro-2,2 - dimethyl-s-triazine hydrochloride as a white powder which melted at 193–194° C.

The solubility of this salt in water at 25° C. was less than 0.25 percent, and its solubility in 95 percent ethyl alcohol was less than 1 percent.

*Example 22*

(A) 76.5 g. of 3-chloro-4-(sodiomercapto)aniline was interacted with 68.5 g. of cyclohexyl bromide to produce 3-chloro-4-(cyclohexylmercapto)aniline. This base was treated in ethereal solution with dry hydrogen chloride to yield 19.5 g. of 3-chloro-4-(cyclohexylmercapto)aniline hydrochloride.

(B) By refluxing a mixture of 19.5 g. of 3-chloro-4-(cyclohexylmercapto)aniline hydrochloride, 6.1 g. of dicyanodiamide, and 45 ml. of acetone, there was obtained 6.8 g. of 4,6-diamino-1-(3-chloro-4-cyclohexylmercaptophenyl)-1,2-dihydro-2,2-dimethyl-s-triazine hydrochloride as a fluffy white powder which melted at 201–202° C.

The solubility of this salt in water at 25° C. was less than 0.25 percent, and its solubility in 95 percent ethyl alcohol was less than 1 percent.

*Example 23*

(A) 61.2 g. of 2-methylmercapto-4-nitrochlorobenzene was refluxed for three and one-half hours with a mixture of 106.2 g. of 59 percent sodium sulfide and 576 ml. of water, thereby producing 3-methylmercapto-4-(sodiomercapto)aniline. Methylation of the latter with 28.6 ml. of dimethyl sulfate yielded 3,4-bis(methylmercapto)aniline, which was treated in ethereal solution with dry hydrogen chloride to yield 49 g. of 3,4-bis(methylmercapto)aniline hydrochloride, which melted at 228–230° C.

(B) By refluxing a mixture of 43 g. of 3,4-bis(methylmercapto)aniline hydrochloride, 17.4 g. of dicyanodiamide, and 430 ml. of acetone, there was obtained 48.8 g. of 4,6-diamino-1-[3,4-bis(ethylmercapto)phenyl]-1,2-dihydro-2,2-dimethyl-s-triazine hydrochloride as a yellow powder which melted at 240–241° C.

The solubility of this salt in water at 25° C. was less than 0.25 percent, and its solubility in 95 percent ethyl alcohol was less than 1 percent.

*Example 24*

(A) 85.6 g. of 2-ethylmercapto-4-nitrochlorobenzene was refluxed for three hours with a mixture of 139.2 g. of 59 percent sodium sulfide and 765 ml. of water, thereby producing 3 - ethylmercapto - 4 - (sodiomercapto)aniline. Methylation of a portion (one-quarter of the yield) of the latter with 7.5 ml. of dimethyl sulfate yielded 3-ethylmercapto-4-methylmercaptoaniline, which was treated in ethereal solution with dry hydrogen chloride to yield 10.4 g. of 3-ethylmercapto-4-methylmercaptoaniline hydrochloride, which when recrystallized from 95 percent ethyl alcohol melted at 226–228° C.

(B) By refluxing a mixture of 14.8 g. of 3-ethylmercapto-4-methylmercaptoaniline hydrochloride, 5.65 g. of dicyanodiamide, and 148 ml. of acetone, there was obtained 19.2 g. of 4,6-diamino-1-(3-ethylmercapto-4-methylmercaptophenyl)-1,2-dihydro-2,2-dimethyl-s-triazine hydrochloride as an off-white powder which melted at 227–229° C.

The solubility of this salt in water at 25° C. was less than 0.25 percent, and its solubility in 95 percent ethyl alcohol was less than 1 percent.

*Example 25*

(A) 55 g. of 2-methylmercapto-4-nitrochlorobenzene was refluxed for three hours with a mixture of 95.6 g. of 50 percent sodium sulfide and 518 ml. of water, thereby producing 3 - methylmercapto-4-(sodiomercapto)aniline. Methylation of a portion (one-half of the yield) of the latter with 17.6 ml. of diethyl sulfate yielded 3-methylmercapto-4-ethylmercaptoaniline, which was treated in ethereal solution with dry hydrogen chloride to yield 13.4 g. of 3-methylmercapto-4-ethylmercaptoaniline hydrochloride, which after recrystallization from isopropyl alcohol melted at 233–235° C.

(B) By refluxing a mixture of 11.1 g. of 3-methylmercapto-4-ethylmercaptoaniline hydrochloride, 4.25 g. of dicyanodiamide, and 110 ml. of acetone, there was obtained 13.5 g. of 4,6-diamino-1-(3-methylmercapto-4-ethylmercaptophenyl) - 1,2 - dihydro - 2,2 - dimethyl-s-triazine hydrochloride as an off-white powder which melted at 218–219° C.

The solubility of this salt in water at 25° C. was less than 0.25 percent, and its solubility in 95 percent ethyl alcohol was less than 1 percent.

*Example 26*

(A) 142 g. of 2-hydroxy-6-nitrobenzothiazole was heated in an autoclave with approximately 1650 ml. of ammonium hydroxide (28–29 percent solution of ammonia in water) at 145–160° C. for four hours to produce the ammonium salt of 2-amino-5-nitrothiophenol, which was propylated by treatment with 33 ml. of n-propyl bromide and 48.2 ml. of 35 percent aqueous sodium hydroxide solution to yield 33.7 g. of 2-n-propylmercapto-4-nitroaniline. This procedure was repeated several times. 127 g. of 2-n-propylmercapto-4-nitroaniline obtained in this manner was diazotized and the resulting diazonium salt was treated with cuprous chloride to produce 77 g. of 2-n-propylmercapto-4-nitrochlorobenzene, which was treated with a mixture of 117.6 g. of 59 percent sodium sulfide and 687 ml. of water to yield 3-n-propyl-mercapto-4-(sodiomercapto)aniline. One-half of the yield of the latter product was methylated by treatment with 15.7 g. of dimethyl sulfate and the resulting 3-n-propylmercapto-4-methylmercaptoaniline was treated in ethereal solution with dry hydrogen chloride to produce 10.2 g. of 3-n-propylmercapto-4-methylmercaptoaniline hydrochloride, which when recrystallized from 95 percent ethyl alcohol melted at 192–193° C.

(B) By refluxing a mixture of 14.1 g. of 3-n-propylmercapto-4-methylmercaptoaniline hydrochloride, 5.0 g. of dicyanodiamide, and 141 ml. of acetone, there was obtained 6.7 g. of 4,6-diamino-1-(3-n-propylmercapto-4-methylmercaptophenyl) - 1,2 - dihydro - 2,2 - dimethyl-s-triazine hydrochloride as a pale yellow powder which melted at 238–239° C.

The solubility of this salt in water at 25° C. was less than 0.25 percent, and its solubility in 95 percent ethyl alcohol was less than 1 percent.

*Example 27*

By refluxing a mixture of 15 g. of 3-methylmercapto-4-n-propylmercaptoaniline hydrochloride (obtained by interacting 3 - methylmercapto - 4 - (sodiomercapto)aniline with n-propyl bromide and treating the resulting base in ethereal solution with dry hydrogen chloride) 5.4 g. of dicyanodiamide, and 150 ml. of acetone, there was obtained 18.7 g. of 4,6-diamino-1-(3-methylmercapto-4-n-propylmercaptophenyl) - 1,2 - dihydro - 2,2 - dimethyl-s-triazine hydrochloride as a white powder which melted at 211–212° C.

The solubility of this salt in water at 25° C. was less than 0.25 percent, and its solubility in 95 percent ethyl alcohol was less than 1 percent.

*Example 28*

By refluxing a mixture of 19.2 g. of 3,4-bis(ethylmercapto)aniline hydrochloride (obtained by interacting 3-ethylmercapto-4-(sodiomercapto)aniline with diethyl sulfate and treating the resulting base in ethereal solution with dry hydrogen chloride) 6.9 g. of dicyanodiamide, and 192 ml. of acetone, there was obtained 19 g. of 4,6-diamino - 1 - [3,4-bis(ethylmercapto)phenyl]-1,2-dihydro-2,2-dimethyl-s-triazine hydrochloride as a yellow powder which melted at 227–229° C.

The solubility of this salt in water at 25° C. was less than 0.25 percent, and its solubility in 95 percent ethyl alcohol was less than 1 percent.

*Example 29*

By refluxing a mixture of 8.6 g. of 3-n-propylmercapto-4-ethylmercaptoaniline hydrochloride (obtained by interacting 3-n-propylmercapto-4-(sodiomercapto)aniline with diethyl sulfate, and treating the resulting base with dry hydrogen chloride), 2.9 g. of dicyanodiamide, and 86 ml. of acetone, there was obtained 3.7 g. of 4,6-diamino-1-(3-n-propylmercapto-4-ethylmercaptophenyl)-1,2 - dihydro-2,2-dimethyl-s-triazine hydrochloride as a white powder which melted at 230–231° C.

The solubility of this salt in water at 25° C. was less than 0.25 percent, and its solubility in 95 percent ethyl alcohol was less than 1 percent.

*Example 30*

By refluxing a mixture of 17.1 g. of 3-ethylmercapto-4-n-propylmercaptoaniline hydrochloride (obtained by interacting 3-ethylmercapto-4-(sodiomercapto)aniline with n-propyl bromide, and treating the resulting base with dry hydrogen chloride), 5.85 g. of dicyanodiamide, and 171 ml. of acetone, there was obtained 9.3 g. of 4,6-diamino-1-(3-ethylmercapto-4-n-propylmercaptophenyl) - 1,2-dihydro-2,2-dimethyl-s-triazine hydrochloride as a white powder which melted at 216–218° C.

The solubility of this salt in water at 25° C. was less than 0.25 percent, and its solubility in 95 percent ethyl alcohol was less than 1 percent.

*Example 31*

By refluxing a mixture of 7.7 g. of 3,4-bis(n-propylmercapto)aniline hydrochloride (obtained by interacting 3-n-propylmercapto-4-(sodiomercapto)aniline with n-propyl bromide, and treating the resulting base with dry hydrogen chloride), 2.46 g. of dicyanodiamide, and 77 ml. of acetone, there was obtained 7.0 g. of 4,6-diamino-1-[3,4-bis(n - propylmercapto)phenyl] - 1,2 - dihydro - 2,2-dimethyl-s-triazine hydrochloride as as a white powder which melted at 219–220° C.

The solubility of this salt in water at 25° C. was less than 0.25 percent, and its solubility in 95 percent ethyl alcohol was less than 1 percent.

*Example 32*

(A) A mixture of 50 g. of 4,6-diamino-1-(3-chloro-4-n - butylmercaptophenyl) - 1,2 - dihydro - 2,2 - dimethyl-s-triazine hydrochloride, 13.4 ml. of 30 percent hydrogen peroxide solution, 340 ml. of acetic acid, and 140 ml. of water was stirred at room temperature for four hours. The reaction mixture thus obtained was concentrated under reduced pressure to a volume of about 100 ml., diluted with 300 ml. of isopropyl alcohol, mixed with decolorizing charcoal and filtered. The filtrate was diluted with anhydrous diethyl ether and chilled. The solid which separated from solution was collected on a filter, washed with cold isopropyl alcohol and then with anhydrous diethyl ether, and dried. There was thus obtained 14 g. of 4,6 - diamino - 1 - (3 - chloro -4 - n - butylsulfinylphenyl) - 1,2-dihydro-2,2-dimethyl-s-triazine hydrochloride as a white powder which melted at 200–201° C. (dec.).

This salt was soluble in water at 25° C. to the extent of 1 percent. The pH of the 1 percent aqueous solution was 5.30, and no precipitate formed when the pH of this solution was adjusted to 7.0 by addition of N/10 sodium hydroxide solution.

(B) Proceeding in a manner similar to that described in part A above, by treatment of the appropriate corresponding alkylmercapto compounds with one equivalent of hydrogen peroxide there were prepared:

(a) 4,6 - diamino - 1 - (3 - chloro - 4 - methylsulfinylphenyl) - 1,2 - dihydro - 2,2 - dimethyl - s - triazine hydrochloride, as a white powder which melted at 204–216° C. (dec.) and was soluble in water at 25° C. to the extent of 5 percent, the pH of a 1 percent aqueous solution of this salt being 5.8.

(b) 4,6 - diamino - 1 - (3 - chloro - 4 - ethylsulfinylphenyl) - 1,2 - dihydro - 2,2 - dimethyl - s - triazine hydrochloride as a white powder which melted at 213–217° C. (dec.) and was soluble in water at 25° C. to the extent of 5 percent, the pH of a 1 percent aqueous solution of this salt being 3.7.

(c) 4,6 - diamino - 1 - (3 - chloro - 4 - n - propylsulfinylphenyl) - 1,2 - dihydro - 2,2 - dimethyl - s - triazine hydrochloride, as a white powder which melted at 205–206° C. and the solubility of which in water at 25° C. was less than 0.25 percent and in 95 percent ethyl alcohol was less than 1 percent.

(d) 4,6 - diamino - 1 - (3 - chloro - 4 - allylsulfinylphenyl) - 1,2 - dihydro - 2,2 - dimethyl - s - triazine hydrochloride, as a powder which melted at 204–205° C. and the solubility of which in water at 25° C. was less than 0.25 percent and in 95 percent ethyl alcohol was less than 1 percent.

(e) 4,6 - diamino - 1 - (3 - chloro - 4 - cyclopentylsulfinylphenyl) - 1,2 - dihydro - 2,2 - dimethyl - s - triazine hydrochloride, as a white powder which melted at 201–202° C. and the solubility of which in water at 25° C. was less than 0.25 percent and in 95 percent ethyl alcohol was less than 1 percent.

(f) 4,6 - diamino - 1 - (3,5 - dichloro - 4 - ethylsulfinylphenl) - 1,2 - dihydro - 2,2 - dimethyl - s - triazine hydrochloride, as an off-white powder which melted at 206–207° C. and the solubility of which in water at 25° C. was less than 0.25 percent and in 95 percent ethyl alcohol was less than 1 percent.

*Example 33*

(A) To a slurry of 71 g. of 4,6-diamino-1-(3-chloro-4-methylmercaptophenyl )- 1,2 - dihydro - 2,2 - dimethyl-s-triazine hydrochloride in 355 ml. of water there was added dropwise 78 ml. of peracetic acid solution (0.426 mg. peracetic acid per ml.). The temperature of the reaction mixture rose gradually, and was kept below 35° C. with external cooling. Four hours after the addition of the peracetic acid was started, the reaction mixture was chilled, and the solid which separated from solution was collected on a filter, washed with cold water, and dried. There was thus obtained 50 g. of 4,6-diamino-1-(3 - chloro - 4 - methylsulfonylphenyl) - 1,2 - dihydro-2,2-dimethyl-s-triazine hydrochloride as a white powder which melted at 232–238° C. The solubility of this salt in water at 25° C. was less than 0.25 percent and in 95 percent ethyl alcohol was less than 1 percent.

(B) Proceeding in a manner similar to that described in part A above, by treatment of the appropriate corresponding alkylmercapto compounds with two equivalents of peracetic acid there were prepared:

(a) 4,6 - diamino - 1 (3 - chloro - 4 - ethylsulfonylphenyl) - 1,2 - dihydro - 2,2 - dimethyl - s - triazine hydrochloride, as a white powder which melted at 195–198° C. and was soluble in water at 25° C. to the extent of 1 percent, the pH of the 1 percent aqueous solution being 3.6.

(b) 4,6 - diamino - 1 - (3 - chloro - 4 - n - propylsulfonylphenyl) - 1,2 - dihydro - 2,2 - dimethyl - s - triazine hydrochloride, as white crystals which melted at 190–191° C. and was soluble in water to the extent of 1 percent, the pH of the 1 percent aqueous solution being 4.5, and no precipitate formed when the pH of this solution was adjusted to 7.0 by the addition of N/10 sodium hydroxide solution.

(c) 4,6 - diamino - 1 - (3 - chloro - 4 - n - butylsulfonylphenyl) - 1,2 - dihydro - 2,2 - dimethyl - s - triazine hydrochloride, as white crystals which melted at 192–196° C. and the solubility of which in water at 25° C. was less than 0.25 percent and in 95 percent ethyl alcohol was less than 1 percent.

*Example 34*

A mixture of 86.7 g. of 3-chloro-4-(4-nitrophenylmercapto)aniline (obtained by interacting 3-chloro-4-(sodiomercapto)aniline with p-nitrochlorobenzene), 26.6 g. of dicyanodiamide, 25.8 ml. of concentrated hydrochloric acid, and 715 ml. of acetone was refluxed for twenty-four hours. The reaction mixture was then chilled in an ice-bath and filtered, and the solid thus collected was washed with acetone and dried. There was thus obtained 103.9 g. of 4,6-diamino-1-[3-chloro-4-(4-nitrophenylmercapto)phenyl]-1,2-dihydro-2,2-dimethyl-s-triazine hydrochloride as a yellow powder which melted at 200–209° C. The solubility of this salt in water at 25° C. was less than 0.25 percent and in 95 percent ethyl alcohol was less than 1 percent.

*Example 35*

By refluxing a mixture of 68 g. of 3-chloro-4-(2-chloro-4-nitrophenylmercapto)aniline (obtained by interacting 3-chloro-4-(sodiomercapto)aniline with 3,4-dichloronitrobenzene), 18.6 g. of dicyanodiamide, 18.8 ml. of concentrated hydrochloric acid, and 500 ml. of acetone, there was obtained 4,6-diamino-1-[3-chloro-4-(2-chloro-4-nitrophenylmercapto)phenyl] - 1,2 - dihydro - 2,2 - dimethyl-s-triazine hydrochloride as a yellow powder which melted at 215–219° C.

The solubility of this salt in water at 25° C. was less than 0.25 percent, and in 95 percent ethyl alcohol was less than 1 percent.

*Example 36*

By refluxing a mixture of 50 g. of p-(p-nitrophenylmercapto)aniline, 16.8 g. of dicyanodiamide, 17.5 ml. of concentrated hydrochloric acid, and 500 ml. of acetone, there was obtained 4,6-diamino-1-[p-(p-nitrophenylmercapto)phenyl] - 1,2 - dihydro - 2,2 - dimethyl - s - triazine hydrochloride as an orange-yellow powder which melted at 215–218° C.

The solubility of this salt in water at 25° C. was less than 0.25 percent and in 95 percent ethyl alcohol was less than 1 percent.

*Example 37*

(A) A mixture of 55.8 g. of p-(p-nitrophenylmercapto)-aniline hydrochloride, 16.5 g. of dicyanodiamide, 24.5 ml. of a 4.1 N ethanolic solution of hydrogen chloride, and 172 ml. of anhydrous ethyl alcohol was refluxed for four hours. The reaction mixture was then chilled and filtered, and the solid thus collected was washed with cold anhydrous ethyl alcohol. The solid, which weighed 45.7 g., was recrystallized from methyl alcohol with charcoaling to yield 16 g. of 1-[p-(p-nitrophenylmercapto)phenyl]biguanide hydrochloride as yellow prisms which melted at 242–245° C. The solubility of this salt in water at 25° C. was less than 0.25 percent and in 95 percent ethyl alcohol was less than 1 percent.

(B) A mixture of 40.5 g. of 1-[p-(p-nitrophenylmercapto)phenyl]biguanide hydrochloride, 19.5 ml. of n-butyraldehyde, 9.22 ml. of concentrated hydrochloric acid, and 124 ml. of anhydrous ethyl alcohol was refluxed for five hours. The reaction mixture was then chilled and filtered, and the solid thus collected was washed with cold anhydrous ethyl alcohol and dried. This product, which weighed 34.6 g., was dissolved in methyl alcohol, the resulting solution was treated with charcoal and filtered. The filtrate was cooled in an ice bath, and the yellow solid which separated from solution was collected on a filter, washed with cold methyl alcohol, and dried. There was thus obtained 17.5 g. of 4,6-diamino-1-[p-(p-nitrophenylmercapto)phenyl] - 1,2 - dihydro - 2 - n - propyl-s-triazine hydrochloride as a yellow powder which melted at 226–227° C.

The solubility of this salt in water at 25° C. was less than 0.25 percent and in 95 percent ethyl alcohol was less than 1 percent.

*Example 38*

(A) 3-chloro-4-(sodiomercapto)aniline was interacted with equimolecular quantity of potassium ferricyanide in aqueous solution in the presence of diethyl ether. There was thus produced, and isolated from the ether layer, 2,2'-dichloro-4,4'-diaminodiphenyl disulfide, which melted at 138–142° C. when crystallized from toluene.

(B) A mixture of 28 g. of 2,2'-dichloro-4,4'-diaminodiphenyl disulfide, 15.7 g. of dicyanodiamide, 15.7 ml. of concentrated hydrochloric acid, and 410 ml. of acetone was refluxed for twenty-four hours. The reaction mixture was then chilled and the tan solid which separated from solution was collected on a filter, washed with acetone, and dried. The solid thus obtained, which weighed 49 g., was recrystallized from 1480 ml. of methyl alcohol containing 1.2 ml. of concentrated hydrochloric acid. There was thus obtained 21.2 g. of bis[2-chloro-4-(4,6-diamino - 1,2 - dihydro - 2,2 - dimethyl - s - triazin - 1-yl)phenyl] disulfide dihydrochloride as an off-white powder which melted at 218–219° C.

The solubility of this salt in water at 25° C. was less than 0.25 percent, and in 95 percent ethyl alcohol was less than 1 percent.

Following procedures similar to those described in the foregoing examples there can be obtained in accordance with our invention:

4,6 - diamino - 1 - (3 - fluoro - 4 - methylmercaptophenyl-1,2-dihydro-2-n-butyl-s-triazine hydrochloride;

4,6 - diamino - 1 - (2 - bromo - 5 - ethylmercaptophenyl)-1,2-dihydro-2,2-diethyl-s-triazine hydrochloride;

4,6 - diamino - 1 - [3 - iodo - 4 - (p - tolylmercapto) phenyl]-1,2-dihydro-2,2-dimethyl-s-triazine hydrochloride;

4,6 - diamino - 1 - [3 - chloro - 4 - (3 - chlorophenylmercapto)phenyl]-1,2-dihydro-2,2-dimethyl-s-triazine hydrochloride;

4,6 - diamino - 1 - [3 - chloro - 4 - (3 - chloro - 4 - nitrophenylsulfonyl)phenyl] - 1,2 - dihydro - 2,2 - dimethyl-s-triazine hydrochloride;

4,6 - diamino - 1 - [3 - fluoro - 4 - (3 - nitrobenzylsulfinyl)phenyl] - 1,2 - dihydro - 2,2 - dimethyl - s - triazine hydrochloride;

4,6 - diamino - 1 - [3 - chloro - 4 - (3 - nitro - 4 - chlorobenzylmercapto)phenyl] - 1,2 - dihydro - 2,2 - dimethyl-s-triazine hydrochloride;

Bis[3 - fluoro - 4 - (4,6 - diamino - 1,2 - dihydro - 2 - n-propyl - s - triazin - 1 - yl)phenyl]disulfide hydrochloride;

4,6-diamino - 1 - [p-(m-nitrophenylmercapto)phenyl]-1,2-dihydro-2,2-dimethyl-s-triazine hydrochloride; and 4,6-diamino - 1 - [p-(o-nitrophenylsulfonyl)phenyl]-1,2-dihydro-2,2-dimethyl-s-triazine hydrochloride.

The hydrochloride salts obtained as described in the foregoing examples are readily converted to the corresponding free base forms by treatment with sodium hydroxide solution, and when the free bases thus obtained are interacted with hydrochloric acid the hydrochlorides are regenerated, or when the free bases are interacted with other inorganic or organic acids the corresponding acid-addition salts are obtained. For example, by treatment of 4,6-diamino-1-(3-chloro-4-methylmercaptophenyl)-1,2-dihydro-2,2-dimethyl-s-triazine hydrochloride with one equivalent of sodium hydroxide there is obtained 4,6-diamino-1-(3-chloro-4-methylmercaptophenyl)-1,2-dihydro-2,2-dimethyl-s-triazine, which reacts with one equivalent of methanesulfonic acid to yield 4,6-diamino-1-(3-chloro-4-methylmercaptophenyl)-1,2-dihydro-2,2-dimethyl-s-triazine methanesulfonate.

The compounds of the instant invention have been found to be useful as anticoccidial agents for the control of coccidial infections in fowl, in which various species of the genus Eimeria, for instance *Eimeria tenella,* are the etiological agents. In such application the compounds are particularly useful prophylactically as coccidiostatic agents in protecting chickens against cecal coccidiosis. Conveniently, the compounds are administered in the feed of the birds. Good anticoccidial results are obtained when each bird is fed daily poultry feed containing approximately 0.25–0.1% by weight of compounds of this invention.

Our new compounds were found to be especially effective when used in combination with other anticoccidial agents such as 2,2'-thiobis(2,4-dichlorophenol), also known as bithionol, and the cupric salt of bithionol, to form potentiated anticoccidial mixtures.

The following compounds were found to have effective antimalarial activity when tested at the indicated dose levels intragastrically in ducks infected with *Plasmodium lophurae:*

4,6 - diamino - 1 - (3 - chloro - 4 - methylmercaptophenyl)-1,2-dihydro-2,2-dimethyl-s-triazine hydrochloride (Example 1B), 6.25–25 mg./kg./day;

4,6 - diamino - 1 - (3 - chloro - 4 - ethylmercaptophenyl)-1,2-dihydro-2,2-dimethyl-s-triazine hydrochloride Example 3B), 10 mg./kg./day;

4,6 - diamino - 1 - (3 - chloro - 4 - n - propylmercaptophenyl)-1,2-dihydro-2,2-dimethyl-s-triazine hydrochloride (Example 4), 10–50 mg./kg./day;

4,6 - diamino - 1 - (3 - chloro - 4 - isopropylmercaptophenyl)-1,2-dihydro-2,2-dimethyl-s-triazine hydrochloride (Example 5), 10 mg./kg./day;

4,6 - diamino - 1 - (3 - chloro - 4 - n - butylmercaptophenyl)-1,2-dihydro-2,2-dimethyl-s-triazine hydrochloride (Example 6), 1.125–10 mg./kg./day;

4,6 - diamino - 1 - (3 - chloro - 4 - n - amylmercaptophenyl)-1,2-dihydro-2,2-dimethyl-s-triazine hydrochloride (Example 7), 10 mg./kg./day;

4,6 - diamino - 1 - (3 - methylmercapto - 4 - chlorophenyl)-1,2-dihydro-2,2-dimethyl-s-triazine hydrochloride (Example 10C), 1.125–5 mg./kg./day;

4,6 - diamino - 1 -(3 - chloro - 4 - allylmercaptophenyl)- 1,2-dihydro - 2,2 - dimethyl-s-triazine hydrochloride (Example 11), 10 mg./kg./day;

4,6 - diamino - 1 - (3 - chloro - 4 - methallylmercaptophenyl)-1,2-dihydro-2,2-dimethyl-s-triazine hydrochloride (Example 12), 1.25–10 mg./kg./day;

4,6 - diamino - 1 - [3 - chloro - 4 - (p - chlorobenzylmercapto)-phenyl]-1,2-dihydro-2,2-dimethyl-s-triazine hydrochloride (Example 14), 10 mg./kg./day;

4,6 - diamino - 1 - (3,5 - dichloro - 4 - methylmercaptophenyl)-1,2-dihydro-2,2-dimethyl-s-triazine hydrochloride (Example 16), 100 mg./kg./day;

4,6 - diamino - 1 - (3,5 - dichloro - 4 - ethylmercaptophenyl)-1,2-dihydro-2,2-dimethyl-s-triazine hydrochloride (Example 17), 10 mg./kg./day;

4,6 - diamino - 1 - (3,5 - dichloro - 4 - n - butylmercaptophenyl) - 1,2 - dihydro - 2,2 - dimethyl - s - triazine hydrochloride (Example 19), 5–10 mg./kg./day;

4,6 - diamino - 1 - (3,5 - dichloro - 4 - n - amylmercaptophenyl) - 1,2 - dihydro - 2,2 - dimethyl - s - triazine hydrochloride (Example 20), 5–10 mg./kg./day;

4,6 - diamino - 1 - (3 - chloro - 4 - cyclopentylmercaptophenyl)-1,2-dihydro-2,2-dimethyl-s-triazine hydrochloride (Example 21B), 5–10 mg./kg./day;

4,6 - diamino - 1 [3,4 - bis(methylmercapto)phenyl]-1,2-dihydro-2,2-dimethyl-s-triazine hydrochloride (Example 23B), 100 mg./kg./day;

4,6 - diamino - 1 - (3 - ethylmercapto - 4 - methylmercaptophenyl) - 1,2 - dihydro - 2,2 - dimethyl-s-triazine hydrochloride (Example 24B), 5–10 mg./kg./day;

4,6 - diamino - 1 - (3 - methylmercapto - 4 - ethylmercaptophenyl - 1,2 - dihydro - 2,2 - dimethyl - s - triazine hydrochloride (Example 25B), 10 mg./kg./day;

4,6 - diamino - 1 - (3 - methylmercapto - 4 - n - propylmercaptophenyl) - 1,2 - dihydro - 2,2 - dimethyl - s - triazine hydrochloride (Example 27), 100 mg./kg./day;

4,6 - diamino - 1 - [3,4 - bis(ethylmercapto)phenyl]-1,2-dihydro-2,2-dimethyl-s-triazine hydrochloride (Example 28), 10 mg./kg./day;

4,6 - diamino - 1 - (3 - chloro - 4 - ethylsulfonylphenyl)-1,2-dihydro-2,2-dimethyl-s-triazine hydrochloride (Example 33B(a)), 10 mg./kg./day; and 4,6 - diamino - 1 - [p - (p - nitrophenylmercapto)-phenyl] - 1,2 - dihydro - 2,2 - dimethyl - s - triazine hydrochloride (Example 36), 50 mg./kg./day.

The following compounds showed effective activity against enterobiasis when administered to mice intragastrically at the indicated dose levels:

4,6 - diamino - 1 - (3 - chloro - 4 - n - propylmercaptophenyl) - 1,2 - dihydro - 2,2 - dimethyl - 1,3,5 - triazine hydrochloride (Example 4), 200–400 mg./kg./day;

4,6 - diamino - 1 - (3 - chloro - 4 - isopropylmercaptophenyl) - 1,2 - dihydro - 2,2 - dimethyl - 1,3,5 - triazine hydrochloride (Example 5), 400 mg./kg./day;

4,6 - diamino - 1 - (3 - chloro - 4 - n - butylmercaptophenyl) - 1,2 - dihydro - 2,2 - dimethyl - s - triazine hydrochloride (Example 6), 200–400 mg./kg./day;

4,6 - diamino - 1 - (3 - chloro - 4 - n - amylmercaptophenyl) - 1,2 - dihydro - 2,2 - dimethyl - s - triazine hydrochloride (Example 7), 200–400 mg./kg./day;

4,6 - diamino - 1 - (3,5 - dichloro - 4 - methylmercaptophenyl) - 1,2 - dihydro - 2,2 - dimethyl - s - triazine hydrochloride (Example 16), 200–400 mg./kg./day;

4,6 - diamino - 1 - (3,5 - dichloro - 4 - n - butylmercaptophenyl) - 1,2 - dihydro - 2,2 - dimethyl - s - triazine hydrochloride (Example 19), 200 mg./kg./day;

4,6 - diamino - 1 - (3,5 - dichloro - 4 - n - amylmercaptophenyl) - 1,2 - dihydro - 2,2 - dimethyl - s - triazine hydrochloride (Example 20), 200 mg./kg./day;

4,6 - diamino - 1 - (3 - chloro - 4 - cyclopentylmercaptophenyl) - 1,2 - dihydro - 2,2 - dimethyl - s - triazine hydrochloride (Example 21B), 400 mg./kg./day;

4,6 - diamino - 1 - (3 - chloro - 4 - methylsulfinylphenyl) - 1,2 - dihydro - 2,2 - dimethyl - s - triazine hydrochloride (Example 32B(a)), 400 mg./kg./day; and 4,6 - diamino - 1 -[p - (p - nitrophenylmercapto)phenyl]-1,2 - dihydro - 2,2 - dimethyl - s - triazine hydrochloride (Example 36), 100–400 mg./kg./day.

4,6 - diamino - 1 - (3 - chloro - 4 - methylsulfonylphenyl)-1,2 - dihydro - 2,2 - dimethyl - s - triazine hydrochloride (Example 33A) was effective against *Endamoeba criceti* in hamsters at a dose level of 100 mg./kg./day intragastrically.

The following compounds were found to have antibacterial activity when tested in vitro against various species of bacteria, for example *Staphylococcus aureus* 209:

4,6 - diamino - 1 - (2 - chloro - 4 - methylmercaptophenyl) - 1,2 - dihydro - 2,2 - dimethyl - s - triazine hydrochloride (Example 2B);

4,6 - diamino - 1 - (3 - chloro - 4 - n - hexylmercaptophenyl) - 1,2 - dihydro - 2,2 - dimethyl - s - triazine hydrochloride (Example 8);

4,6 - diamino - 1 - (3 - chloro - 4 - methylmercaptophenyl) - 1,2 - dihydro - 2 - methyl - 2 - (2 - hydroxyethyl) - s - triazine hydrochloride (Example 9);

4,6 - diamino - 1 - (3 - chloro - 4 - methylmercaptophenyl) - 1,2 - dihydro - 2 - n - hexyl - s - triazine hydrochloride (Example 15B); and 4,6 - diamino - 1 - [3,4 - bis(methylmercapto)phenyl]-1,2 - dihydro - 2,2 - dimethyl - s - triazine hydrochloride (Example 23B).

In hamsters, 4,6 - diamino - 1 - (3 - methylmercapto - 4 - ethylmercaptophenyl) - 1,2 - dihydro - 2,2 - dimethyl-s-triazine hydrochloride (Example 25B) was effective at a dose level of 100 mg./kg./day intragastrically against *Trichomonas gallinae* infection.

Many of the compounds of this invention were found to have high activity as anti-inflammatory agents when tested subcutaneously in mice by a method measuring inhibition of endotoxin induced lung inflammation, for instance 4,6 - diamino - 1 - (3 - chloro - 4 - methylmercaptophenyl) - 1,2 - dihydro - 2 - (n - hexyl) - s - triazine hydrochloride (Example 15B) and 4,6 - diamino - 1- [3,4 - bis(n - propylmercapto)phenyl] - 1,2 - dihydro-2,2-dimethyl-s-triazine hydrochloride (Example 31).

1 - [p - (p - nitrophenylmercapto)phenyl]biguanide hydrochloride (Example 37a) was found to have antibacterial activity when tested in vitro against *Staphylococcus aureus* 209 and *Brevibacterium ammoniagenes*. This compound was also found to be a rodent repellent.

We claim:

1. 4,6 - diamino - 1 - (aryl) - 1,2 - dihydro - 2 - ($R^1$)-2-($R^2$)-s-triazine hydrochloride having the structural formula

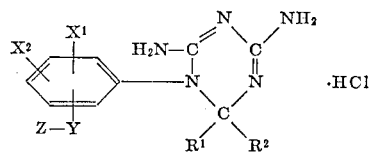

where $R^1$ is a member of the group consisting of lower alkyl and hydroxy-lower alkyl, $R^2$ is a member of the group consisting of hydrogen and lower alkyl, $X^1$ is a member of the group consisting of hydrogen and lower alkyl, $X^1$ is a member of the group consisting of lower alkyl-S-, lower alkyl-SO-, lower alkyl-SO$_2$-, and halogen, $X^2$ is a member of the group consisting of hydrogen and halogen, Y is a member of the group consisting of —S—, —SO—, and —SO$_2$—, and Z is a member of the group consisting of lower alkyl, lower alkenyl, cyclohexyl, cyclopentyl, phenyl, lower alkylphenyl, halophenyl, nitrophenyl, halo-nitrophenyl, benzyl, ar-halobenzyl, ar-nitrobenzyl, and ar-halo-ar-nitrobenzyl.

2. 4,6 - diamino - 1 - (aryl) - 1,2 - dihydro - 2,2 - di-alkyl-s-triazinehydrochloride having the structural formula

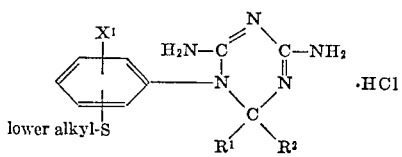

where $R^1$ and $R^2$ are lower alkyl and $X^1$ is halogen.

3. 4,6 - diamino - 1 - (aryl) - 1,2 - dihydro - 2,2 - di-methyl-s-triazine hydrochloride having the structural formula

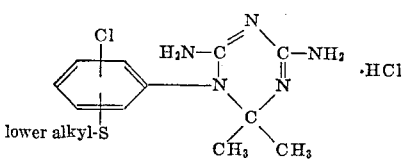

4. 4,6 - diamino - 1 - (3 - chloro - 4 - lower alkylmercaptophenyl) - 1,2-dihydro-2,2-dimethyl-s-triazine hydrochloride.

5. 4,6 - diamino - 1 - (aryl) - 1,2 - dihydro - 2,2 - di-methyl-s-triazine hydrochloride having the structural formula

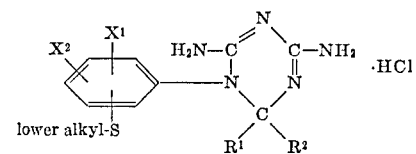

where $R^1$ and $R^2$ are lower alkyl, and $X^1$ and $X^2$ are halgen.

6. 4,6-diamino-1-(3,5-dichloro-4-lower alkyl - mercaptophenyl)-1,2-dihydro-2,2-dimethyl-s-triazine hydrochloride.

7. 4,6 - diamino - 1 - (aryl) - 1,2 - dihydro - 2,2 - di-alkyl-s-triazine hydrochloride having the structural formula

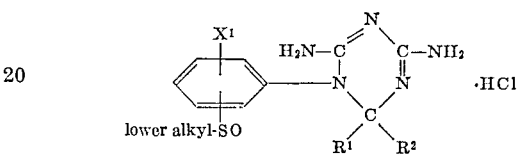

where $R^1$ and $R^2$ are lower alkyl and $X^1$ is halogen.

8. 4,6 - diamino - 1 - (aryl) - 1,2 - dihydro - 2,2 - di-alkyl-s-triazine hydrochloride having the structural formula

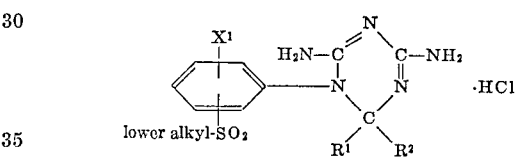

where $R^1$ and $R^2$ are lower alkyl and $X^1$ is halogen.

9. 4,6 - diamino - 1 - (aryl) - 1,2 - dihydro - 2,2 - di-alkyl-s-triazine hydrochloride having the structural formula

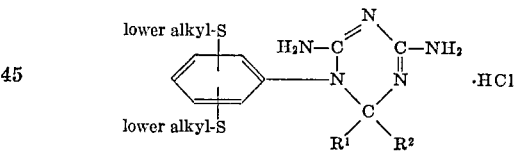

where $R^1$ and $R^2$ are lower alkyl.

10. 4,6 - diamino - 1 - (3 - chloro - 4 - methylmercaptophenyl)-1,2-dihydro-2,2-dimethyl-s-triazine hydrochloride.

11. 4,6 - diamino - 1 - (3,5 - dichloro - 4 - methylmercaptophenyl)-1,2-dihydro-2,2-dimethyl-s - triazine hydrochloride.

12. 4,6 - diamino - 1 - (3 - chloro - 4 - n - propylmercaptophenyl)-1,2-dihydro-2,2-dimethyl-s - triazine hydrochloride.

13. 4,6 - diamino - 1 - (3 - chloro - 4 - isopropylmercaptophenyl)-1,2-dihydro-2,2-dimethyl-s-triazine hydrochloride.

14. 4,6 - diamino - 1 - (3 - chloro - 4 - methylmercaptophenyl)-1,2-dihydro-2-(n-hexyl)-s-triazine hydrochloride.

15. Bis[ar - halo - 4 - (4,6 - diamino - 1,2 - dihydro-2-($R^1$)-2-($R^2$)-s-triazin-1-yl)phenyl] disulfide dihydrochloride having the structural formula

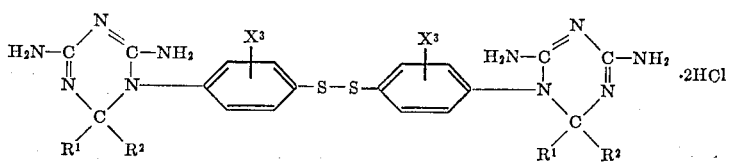

where $R^1$ is a member of the group consisting of lower alkyl and hydroxy-lower alkyl, $R^2$ is a member of the group consisting of hydrogen and lower alkyl, and $X^3$ is halogen.

16. Bis[2 - chloro - 4 - (4,6 - diamino - 1,2 - dihydro-2,2-dimethyl-s-triazin-1 - yl)phenyl] disulfide dihydrochloride.

17. 4,6 - diamino - 1 - [4 - (nitrophenyl - Y)phenyl]-1,2-dihydro-2-($R^1$)-2-($R^2$)-s-triazine hydrochloride having the structural formula

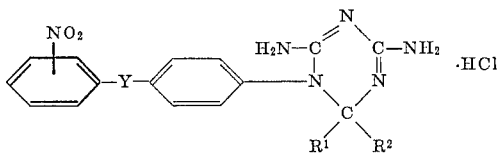

where $R^1$ is a member of the group consisting of lower alkyl and hydroxy-lower alkyl, $R^2$ is a member of the group consisting of hydrogen and lower alkyl, and Y is a member of the group consisting of —S—, —SO—, and —SO$_2$—.

18. 4,6 - diamino - 1 - [p - (p - nitrophenylmercapto)-phenyl]-1,2-dihydro-2-n-propyl-s-triazine hydrochloride.

References Cited by the Examiner

UNITED STATES PATENTS

| | | | |
|---|---|---|---|
| 2,389,150 | 11/1945 | Jayne et al. | 260—249.9 |
| 2,422,888 | 6/1947 | Curd et al. | 260—565 XR |
| 2,531,405 | 11/1950 | Curd et al. | 260—565 |
| 2,544,827 | 3/1951 | Curd et al. | 260—565 |
| 2,803,628 | 8/1957 | Crowther | 260—249.9 |
| 2,836,539 | 5/1958 | Cutler | 260—249.9 XR |
| 2,900,385 | 8/1959 | Modest | 260—249.9 |
| 2,926,165 | 2/1960 | Shapiro et al. | 260—249.9 |
| 2,934,535 | 4/1960 | Sutton | 260—249.9 |
| 3,074,947 | 1/1963 | Elsager et al. | 260—249.9 |

OTHER REFERENCES

Wiselogle: "Survey of Antimalarial Drugs 1941–1945," vol. 1, Pt. II (1946), pp. 787–788.

WALTER A. MODANCE, *Primary Examiner.*

NICHOLAS S. RIZZO, *Examiner.*

MARION W. WESTERN, JOHN M. FORD,
*Assistant Examiners.*

UNITED STATES PATENT OFFICE
CERTIFICATE OF CORRECTION

Patent No. 3,272,814                                     September 13, 1966

Royal A. Cutler et al.

It is hereby certified that error appears in the above numbered patent requiring correction and that the said Letters Patent should read as corrected below.

Column 2, line 55, for "acid-solution" read -- acid-addition --; column 5, line 20, for "keytones" read -- ketones --; column 6, line 11, for "(methylsulfinly)" read -- (methylsulfinyl) --; column 11, line 44, for "(ethylmercapto)" read -- (methylmercapto) --; column 13, line 46, strike out "as", second occurrence; column 14, lines 33 and 34, for "ethylsulfinylphenl)" read -- ethylsulfinylphenyl) --; column 14, line 61, for "1 (3-" read -- 1-(3- --; column 16, lines 34 and 35, for "methylmercaptophenyl" read -- methylmercaptophenyl) --; column 17, line 25, for "Example 3B)" read -- (Example 3B) --; line 66, for "1 [3,4-" read -- 1-[3,4- --; lines 73 and 74, for "ethylmercaptophenyl" read -- ethylmercaptophenyl) --; column 19, line 11, for "(Example 37a)" read --(Example 37A) --; column 20, line 10, for "halgen" read -- halogen --.

Signed and sealed this 29th day of August 1967.

(SEAL)
Attest:

ERNEST W. SWIDER                                    EDWARD J. BRENNER
Attesting Officer                                      Commissioner of Patents